United States Patent [19]
Bateman

[11] 3,947,808
[45] Mar. 30, 1976

[54] EXCESSIVE DESCENT RATE WARNING SYSTEM FOR AIRCRAFT

[75] Inventor: Charles Donald Bateman, Bellevue, Wash.

[73] Assignee: Sundstrand Data Control, Inc., Redmond, Wash.

[22] Filed: Jan. 22, 1975

[21] Appl. No.: 540,475

[52] U.S. Cl. ........ 340/27 AT; 73/178 R; 235/150.2; 244/77 D; 343/7 TA; 343/112 A; 343/112 CA
[51] Int. Cl.² .......................................... G01C 5/00
[58] Field of Search .............. 73/178 R, 178 T, 179; 179/15 A; 235/150.2, 150.22; 244/77 A, 77 D; 340/16 R, 16 M, 16 C, 27, 29, 52 H, 56, 62, 66, 74, 258; 343/56 S, 7 R, 7 TM, 7 ED, 8 F, 7.7, 8, 9, 1 LR, 1 A, 108 R, 112 A, 112 CA, 112 S

[56] References Cited
UNITED STATES PATENTS

| | | | |
|---|---|---|---|
| 2,702,342 | 2/1955 | Korman | 343/112 CA X |
| 2,851,120 | 9/1958 | Fogiel | 343/112 CA X |
| 2,930,035 | 3/1960 | Altekruse | 343/7 TA |
| 3,167,276 | 1/1965 | Moosbrugger et al. | 244/77 D |
| 3,210,760 | 10/1965 | Olson et al. | 343/7 TA |
| 3,245,076 | 4/1966 | Letilly et al. | 343/7 TA |
| 3,248,728 | 4/1966 | Garfield et al. | 343/5 LS |
| 3,578,269 | 5/1971 | Kramer et al. | 244/77 D |
| 3,604,908 | 9/1971 | Loome et al. | 235/150.22 |
| 3,715,718 | 2/1973 | Astengo | 340/27 R |
| 3,766,518 | 10/1973 | Rillett | 343/7 TA X |

OTHER PUBLICATIONS
Bramley, James Q., "Radar Offers Solution to Midair Collisions", *Electronics*, Nov., 1954, pp. 146–150.
Federal Aviation Administration Advisory Circular, "Ground Proximity Warning Systems", Dec. 31, 1974, pp. 1–5, AC No. 25-26.

*Primary Examiner*—Trygve M. Blix
*Assistant Examiner*—Stephen G. Kunin
*Attorney, Agent, or Firm*—Ted E. Killingsworth; Michael B. McMurry

[57] ABSTRACT

In a system that compares the rate of descent of an aircraft with its altitude above ground and generates a warning signal when the sink rate exceeds a predetermined limit for a particular altitude, the maximum warning time is limited to a specified value in order to minimize nuisance warnings at higher altitudes. At a descent rate above a certain value, the excessive sink rate warning signal is inhibited for combinations of descent rates and aircraft altitudes which would provide a warning greater than a selected time to impact, such as 30 seconds.

22 Claims, 2 Drawing Figures

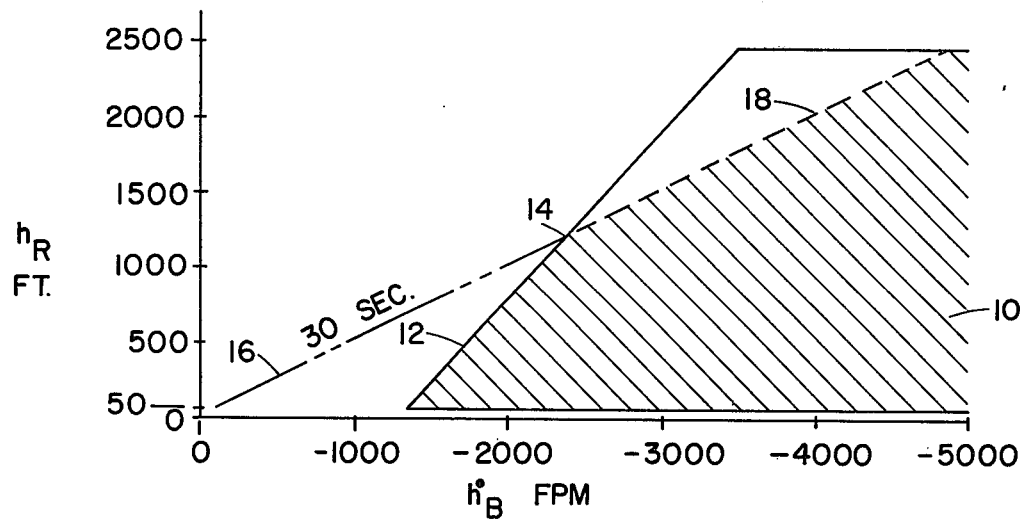
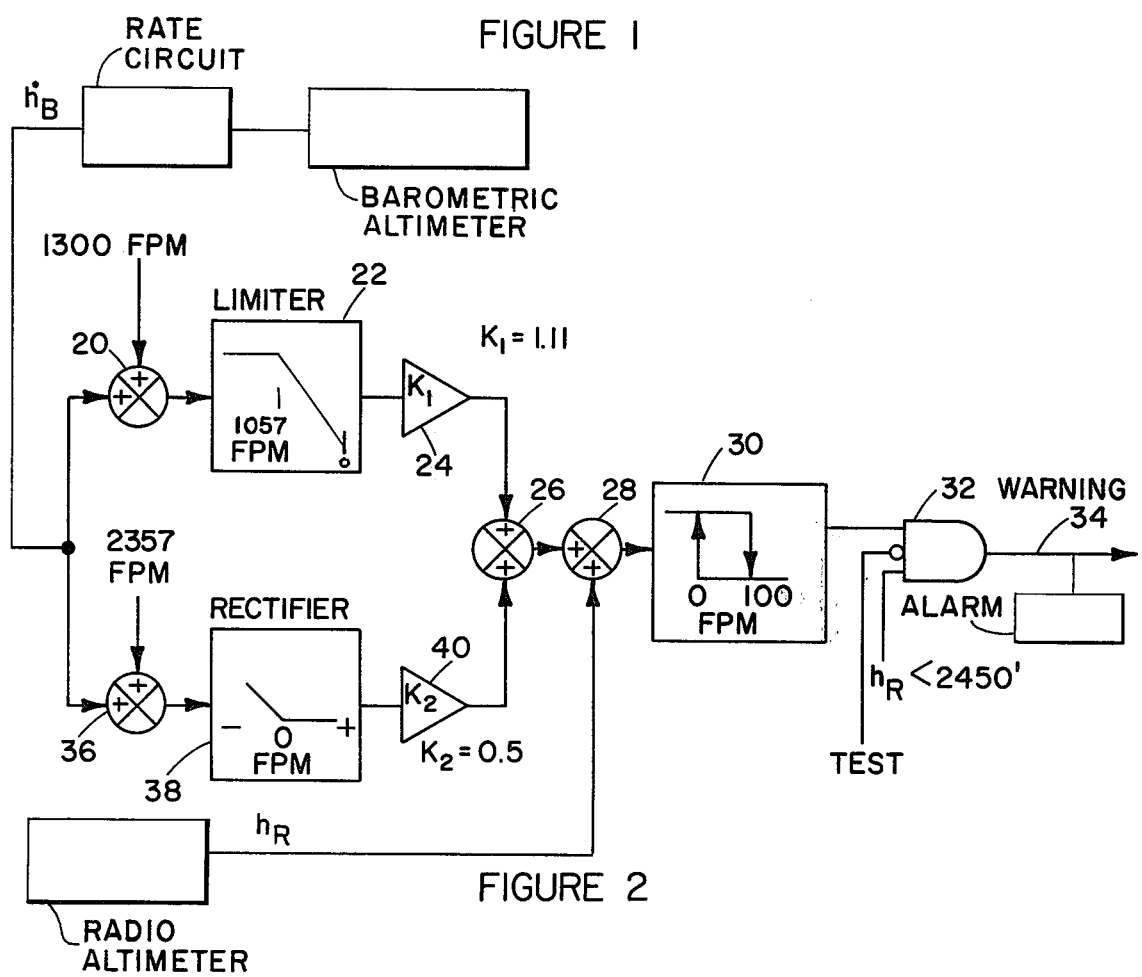

EXCESSIVE DESCENT RATE WARNING SYSTEM FOR AIRCRAFT

BACKGROUN OF THE INVENTION

The invention relates to the field of aircraft ground proximity warning systems and more particularly to systems providing warnings of excessive aircraft descent rates.

In a prior art system, as represented by the U.S. patent application of Bateman, Ser. No. 480,727, entitled "Aircraft Ground Proximity Warning Instrument," filed June 19, 1974, and assigned to the assignee of this application, there is a linear relationship between the aircraft altitude above ground and the descent rate that will generate a warning signal. For example, at an altitude of 2500 feet, a descent rate of 3500 feet per minute is tolerated without generating a warning, whereas at 50 feet, a descent rate of 1300 feet per minute or less is tolerated. In other words, the greater the altitude, the greater the rate of descent that is tolerated by the warning system.

However, there are certain circumstances where normal operating procedures will call for the aircraft to descend at a rate sufficient to trigger the warning system that is based on this particular relationship between aircraft altitude and rate of descent. For example, under visual operating conditions, aircraft are occasionally cleared for landing approach well above the normal 3° descent angle thereby tending to require that the aircraft descend at a relatively rapid rate. As a result, an aircraft attempting to get down to a normal, stabilized approach angle will occasionally trigger the warning system and, in effect, generate a nuisance warning. It is considered important to reduce the number of this type of nuisance warnings due to the fact that air crews will tend to discount the seriousness of the warnings thereby reducing the overall effectiveness and credibility of the ground proximity warning systems.

It has been determined that preventing the triggering of an alarm for a calculated time to ground impact of greater than a predetermined duration, for example 30 seconds, will tend to eliminate the type of nuisance warnings described and, at the same time, have a minimal effect on warning times when the aircraft is in actual danger. By using a "time line" of 30 seconds to limit warnings, the general credibility of the system is enhanced. In addition, a 30 second time line will not only prevent nuisance warnings at higher altitudes but will not affect the warning system at lower altitudes where the aircraft may be in actual danger of impacting the ground.

SUMMARY OF THE INVENTION

It is therefore an object of the invention to provide an excessive descent rate warning system wherein the warning signal is inhibited by a function representing a predetermined time to impact.

It is an additional object of the invention to provide an excessive descent rate warning circuit that alters the relationship between descent rate and altitude above a predefined descent rate in order to limit the generation of a warning signal to a predetermined function of the time to ground impact.

The excessive sink rate warning circuit functions by comparing the aircraft rate of altitude change, as measured by a barometric altimeter, and the aircraft actual altitude above the ground, as measured by a radio altimeter. As the aircraft altitude above ground is reduced, the rate of descent required to trigger a warning is similarly reduced on a linear basis. However, above certain altitudes the combination of distance to the ground and the aircraft rate of descent that triggers a warning, as in the prior art systems, would provide an excessive warning time, i.e., time to potential ground impact.

In order to eliminate these excessive warning times at greater altitudes, a characteristic of the relationship between rate of descent and altitude is changed so as to provide a maximum warning time. This is accomplished by changing the slope of the rate of descent vs. altitude relationship above a selected altitude.

BRIEF DESCRIPTION OF THE DRAWINGS

FIG. 1 is a graphic representation of the relationship between descent rate and altitude above ground that will cause an excessive sink rate warning signal to be generated.

FIG. 2 is a functional block diagram of the circuitry for implementing the warning characteristic shown in FIG. 1.

DETAILED DESCRIPTION OF THE INVENTION

The graphic representation of the warning envelope illustrated in FIG. 1, is provided to show the preferred warning characteristics of the excessive sink rate warning system. The shaded area 10 of the graph, represents the combinations of descent rate and altitude above ground that will generate a warning signal. The first portion 12 of the curve illustrates the boundary relationship between altitude and rate of descent for lower altitudes. The warning is inhibited for altitudes of 50 feet or below in order to prevent warnings from being sounded as the aircraft is landing. From altitudes of 50 feet along the portion 12 of the curve to the point 14, the relationship between altitude and descent rate is linear. At point 14 the slope of the warning boundary curve changes to correspond to a constant time line 16 representing those combinations of descent rates and altitudes that will cause the aircraft to impact the ground at a constant time. The time line shown at 16 represents 30 seconds to impact, e.g., with a descent rate of 2500 fpm a warning is given at an altitude of 1250 feet. At altitudes above point 14 on the warning curve it is considered that a 30 second warning would give the crew of an aircraft ample time to maneuver in order to avoid impacting the ground.

The preferred embodiment of circuitry for generating the warning curves shown in FIG. 1 is provided in FIG. 2 of the drawings. The aircraft descent rate in terms of barometric altitude is represented by the signal $h_B$, which can be generated with a barometric altimeter and rate circuit in the manner disclosed in the Application of Batemen, Ser. No. 480,727. The $h_B$ signal, which is negative when the aircraft is descending, is an input to one of the positive terminals of the summing junction 20. The other input to the summing junction 20 is a signal of positive polarity that represents an increase in altitude of 1300 feet per minute. The sum of these two signals is then applied to the limiter 22. The function of the limiter 22 is to limit the magnitude of the biased $h_B$ signal from the summing junction 20 to a maximum absolute value. In the preferred embodiment, this will be a signal equal to a minus 1057 fpm. The scaling amplifier 24 serves to multiply the output of the limiter 22 by a factor of 1.11. The biased $h_R$ signal, so scaled, is transmitted through the summing junction 26 to the summing junction 28 where it is combined with the $h_R$ signal representing the aircraft altitude above ground. The $h_R$ signal is preferably obtained from a radio altimeter in order to given an accurate measure of the aircraft altitude above the ground.

When the magnitude of the scaled $h_B$ signal from the amplifier 24 exceeds the magnitude of the positive $h_R$ signal, the output of the summing junction 28 will be negative, which in turn, causes the detector 30 to generate a positive output or logic signal to the AND gate 32. Therefore, when the AND gate 32 is enabled, a negative output from the summing junction 28 will generate a warning signal on the line 34 to activate an alarm.

The $h_B$ signal is also utilized as input to the summing junction 36. Here the $h_b$ signal is biased by a positive signal representing a rate of altitude change of 2357 fpm. The rectifier 38 eliminates any positive voltage or signal from being applied to the second scaling amplifier 40. As a result, the scaling amplifier 40 will only have a signal applied to it when the aircraft rate of descent is greater than 2357 fpm. Point 14 on the warning curve of FIG. 1 is on the 30 second ground impact line and has coordinates of 2357 fpm and 1178 feet. The biased $h_B$ signal from the rectifier 38 is then scaled by a factor of 0.5 which corresponds to the slope of the 30 second time to impact line 16, of FIG. 1. The scaled $h_B$ signal from the second scaling amplifier 40 is combined with the limited $h_B$ signal from the first scaling amplifier 24 in the summing junction 26. The combined $h_B$ signals are added to the $h_R$ signal in the summing junction 28 to produce the warning curve of FIG. 1. When the aircraft rate of descent is greater than 2357 fpm, corresponding to point 14 on the curve, the upper portion 18 of the warning curve will correspond to the 30 second time line 16.

With a descent rate $h_B$ less than 1300 fpm, the output of scaling amplifier 24 is 0. The output increases linearly for greater descent rates to a maximum with a descent rate $h_B$ of 2357 fpm, point 14 on the curve. This corresponds with a limiter input of 1057 fpm. The output of scaling amplifier 24 establishes the segment 12 of the warning boundary. The output of scaling amplifier 40 is 0 for descent rates less than 2357 fpm. It increases linearly with greater descent rates and is added to the output of amplifier 24 establishing segment 18 of the warning boundary.

The AND gate 32 has a second input which enables the gate whenever the aircraft is within 2450 feet of the ground. In addition to being the appropriate maximum range of most radio altimeters, it is considered unnecessary to provide excessive sink rate warnings at altitudes of greater than 2500 feet.

The invention has been described in terms of specific rates of descent and altitudes which are preferred. It will be understood that the invention may utilize other values.

I claim:

1. In a system for warning of an excessive rate of aircraft descent, having means for generating a signal representing the rate of descent of the aircraft, means for generating a signal representing altitude of the aircraft above ground, means for combining the descent rate signal with the altitude signal and means for detecting a predetermined combination of said signals to initiate a warning, the improvement, comprising:
   means for scaling one of said descent rate and altitude above ground signals so that the combination of descent rate and altitude for which said detector means initiates a warning establish a warning condition boundary representing at least in part a constant time to ground impact if the descent rate is unchanged.

2. The system of claim 1 additionally including means to enable said scaling means above a predefined descent rate.

3. The system of claim 1 additionally including means to inhibit initiation of a warning above a predetermined altitude.

4. A warning system utilizing aircraft altitude signals and rate of change in aircraft altitude signals for warning of excessive descent rates, comprising:
   first signal means responsive to the altitude and the altitude rate signals for generating a warning signal in conformity to a first predetermined relationship between descent rate and altitude;
   a limit means for restricting the operation of said first signal means to a predetermined range of aircraft altitude rate signals; and
   second signal means responsive to the altitude and altitude rate signals for generating the warning signal in conformity with a second predetermined relationship between descent rate and altitude for a second range of altitude rate signals.

5. The warning system of claim 4 wherein said second signal means includes means for scaling the altitude rate signal in said second range so that the combination of altitude and altitude rate signals for which said second signal means generates a warning signal represents a predetermined time to impact the ground.

6. The warning system of claim 4 wherein said first signal means includes:
   a biasing circuit for biasing the altitude rate signal by a signal representing a first constant descent rate; and
   a circuit operatively connected to said biasing circuit for scaling said biased rate signal to represent a first descent rate versus altitude characteristic.

7. The warning system of claim 6 wherein said limit means includes a limiter circuit to limit said biased rate signal to a predetermined value.

8. The warning system of claim 6 wherein said second signal means includes:
   a biasing circuit for biasing the altitude rate signal by a signal that represents a second constant descent rate; and
   a circuit operatively connected to said biasing circuit for scaling said biased rate signal to represent a second descent rate versus altitude characteristic.

9. The warning system of claim 6 wherein said first signal means includes a summing circuit for combining said first scaled rate signal with the aircraft altitude signal.

10. The warning system of claim 9 additionally including a detector circuit operatively connected to said summing circuit for generating a logic signal for activating an excessive descent warning.

11. The warning system of claim 10 wherein said second signal means includes:
   a biasing circuit for biasing the altitude rate signal by a signal that represents a second constant descent rate;

a circuit operatively connected to said biasing circuit for scaling said biased rate signal to represent a second descent rate versus altitude characteristic;

a summing circuit, operatively connected to said summing circuit in said first signal means, for combining the scaled rate signals from both said first and second signal means for input to said summing circuit; and a rectifier circuit operatively connected between said biasing circuit and said scaling circuit to prevent biased rate signals of a predetermined polarity from being applied to said scaling circuit.

12. The warning system of claim 11 additionally including a logic gate operatively connected to said detector circuit and responsive to an altitude signal representing a maximum altitude for inhibiting said logic signal above said maximum altitude.

13. A warning system for use in aircraft for generating a warning when the descent of the aircraft exceeds a predetermined rate for a given altitude, comprising:

an electronic circuit for generating an altitude signal from a radio altimeter representing the aircraft altitude above ground;

a rate circuit for generating a signal representing the aircraft rate of descent from a barometric altimeter;

a first computational circuit for combining said barometric rate signal with said altitude signal to generate a warning signal as a first function of descent rate versus altitude; and a second computational circuit connected to said first computational circuit and operative only at descent rates exceeding a selected descent rate, for altering said function of descent rate versus altitude of the warning signal to a fixed time to ground impact.

14. The warning system of claim 13 wherein said second computational circuit includes a biasing circuit and a rectifier effective to limit its output below said selected descent rate.

15. An electronic circuit, having radio altimeter and rate of change in barometric altitude signal inputs, for generating a logic signal to activate an excessive descent rate alarm, comprising:

a first summing circuit for adding the altitude rate signal to a first bias signal;

a limiter operatively connected to said first summing circuit;

a first scaling amplifier operatively connected to said limiter;

a second summing circuit for adding the altitude rate signal to a second bias signal;

a rectifier operatively connected to said second summing circuit effective to limit said second biased rate signals to a predetermined polarity;

a second scaling amplifier operatively connected to said rectifier;

a third summing circuit operatively connected to both said first and second scaling amplifiers for summing the outputs of said amplifiers;

a fourth summing circuit operatively connected to said third summing circuit and to the radio altimeter to combine the output of said third summing circuit with the radar altitude signal; and a detector circuit operatively connected to said fourth summing circuit to generate the logic signal for a predetermined signal output of said fourth summing circuit.

16. The electronic circuit of claim 15 additionally including a logic gate operatively connected to said detector and to a source of altitude signal representing a maximum altitude for inhibiting the logic signal above said maximum altitude.

17. A warning instrument for alerting the pilot of an aircraft to a condition of undesired excessive descent rate in proximity to the ground, comprising:

a source of signal representing the rate of descent of the aircraft;

a source of signal representing the altitude of the aircraft above the ground;

means operative below a selected descent rate to scale the descent rate signal by a first factor;

means operative above said selected descent rate to scale the descent rate signal by a second factor;

means for comparing the scaled descent rate signal with the signal representing the altitude of the aircraft above the ground; and means responsive to the comparator to actuate a pilot warning when the scaled descent rate signal exceeds the altitude signal.

18. The warning signal instrument of claim 17 in which the signal from the first scaling means establishes a warning boundary with a first slope below said selected altitude, and said second scaling means establishes a warning boundary with a second slope, less than the first slope, above said selected altitude, to minimize the incidence of unnecessary pilot warnings at altitudes above said selected altitude.

19. The aircraft warning instrument of claim 18 in which the first warning boundary slope represents a time-to-ground intercept which is longer for higher altitudes and greater descent rates than it is for lower altitudes and lesser descent rates.

20. The aircraft warning instrument of claim 19 in which the second warning boundary slope represents a selected time-to-ground intercept for any combination of descent rate and altitude if the aircraft maintains such descent rate.

21. The aircraft warning instrument of claim 20 in which said selected time is 30 seconds.

22. A warning system for generating a warning indicating an excessive aircraft descent rate with respect to the ground that utilizes a signal representing the aircraft barometric descent rate and a signal representing the aircraft altitude above the ground, comprising:

means responsive to the altitude signal and the descent rate signal for generating, at an altitude above ground of approximately 50 feet or greater, a warning signal as a first substantially linear function of descent rate versus altitude wherein said warning signal is generated for descent rates of approximately 1300 fpm and greater at an altitude of 50 feet, and at descent rates of approximately 2357 fpm and greater, at an altitude of 1178 feet above ground;

means responsive to the altitude signal and the descent rate signal for generating said warning signal at altitudes above approximately 1178 feet above ground as a second substantially linear function of descent rate versus altitude wherein said warning signal is generated at descent rates greater than 2357 fpm at an altitude of approximately 1200 feet above ground, and at descent rates of approximately 4900 fpm and greater at an altitude of 2450 feet above ground; and means for inhibiting said warning signal at altitudes of above approximately 2450 feet above the ground.

* * * * *

UNITED STATES PATENT AND TRADEMARK OFFICE
CERTIFICATE OF CORRECTION

PATENT NO. : 3,947,808
DATED      : March 30, 1976
INVENTOR(S) : Charles Donald Bateman It is certified that error appears in the above-identified patent and that said Letters Patent are hereby corrected as shown below:

Column 1, line 5, delete "BACKGROUN" and substitute --BACKGROUND--;

line 10, delete "prior art";

Column 6, claim 18, line 23, delete "said" and substitute --a--.

Signed and Sealed this

Fourth Day of March 1980

[SEAL]

Attest:

Attesting Officer

SIDNEY A. DIAMOND
Commissioner of Patents and Trademarks